United States Patent [19]

Patrick et al.

[11] Patent Number: 4,709,860

[45] Date of Patent: Dec. 1, 1987

[54] SYSTEM FOR APPLYING PESTICIDES WITHOUT DRIFT

[75] Inventors: Keith H. Patrick, Birmingham; Charles W. Murchison, Montgomery, both of Ala.

[73] Assignee: Omni Spray, Inc., Prattville, Ala.

[21] Appl. No.: 843,803

[22] Filed: Mar. 27, 1986

Related U.S. Application Data

[63] Continuation of Ser. No. 616,383, May 31, 1984, abandoned.

[51] Int. Cl.[4] .............................................. A04C 15/04

[52] U.S. Cl. .................................... 239/654; 239/661; 239/336
[58] Field of Search ................... 239/654, 655, 671, 8, 239/77, 78, 79, 62, 661, 336, 565, 156, 310; 248/562, 182, 671, 660, 656; 177/94, 216, 218

[56] References Cited

U.S. PATENT DOCUMENTS

| | | | |
|---|---|---|---|
| 995,167 | 6/1911 | Michaelsen | 248/182 X |
| 1,349,418 | 8/1920 | Flynn | 248/671 X |
| 1,358,260 | 11/1920 | Steinmetz | 248/671 |
| 1,447,269 | 3/1923 | Sirch | 177/216 X |
| 1,691,563 | 11/1928 | Burger | 239/661 X |
| 1,785,932 | 12/1930 | Brown et al. | 239/654 X |
| 2,297,110 | 9/1942 | Parker | 239/77 X |
| 2,310,895 | 2/1943 | Brown | 239/77 |
| 2,476,465 | 7/1949 | Tarrant | 239/654 |
| 2,597,323 | 5/1952 | Hiller et al. | 239/654 X |
| 2,608,792 | 9/1952 | Chater | 239/336 X |
| 2,613,109 | 10/1952 | Walker | 239/77 |
| 2,708,596 | 5/1955 | Weller | 239/172 X |
| 2,844,914 | 7/1958 | Finn | 239/654 X |
| 3,509,742 | 5/1970 | Bauer | 248/562 X |
| 3,707,305 | 12/1972 | de Kinkelder | 239/62 |
| 3,917,170 | 11/1975 | Marino | 239/195 X |
| 4,186,885 | 2/1980 | Christian | 239/654 |
| 4,230,286 | 10/1980 | Leigh et al. | 239/677 |
| 4,277,022 | 7/1981 | Holdsworth et al. | 239/677 X |
| 4,296,695 | 10/1981 | Quanbeck | 239/654 X |
| 4,313,565 | 2/1982 | Focant | 239/227 |
| 4,514,796 | 4/1985 | Saulters et al. | 182/2 X |

FOREIGN PATENT DOCUMENTS

| | | | |
|---|---|---|---|
| 884672 | 8/1945 | France | 239/654 |

*Primary Examiner*—Andres Kashnikow
*Assistant Examiner*—Kevin Patrick Weldon
*Attorney, Agent, or Firm*—Lalos & Keegan

[57] ABSTRACT

Upwardly diverging, transversely opposed barrels at the rear of the vehicle are supported on a transversely swingable discharge assembly. The barrels have blowers at their lower ends and receive metered amounts of particulates from a hopper through a metering device controlled by the speed of the vehicle on which the swingable discharge assembly is mounted. The assembly is so weighted that it remains upright. Split spouts on the ends of the barrels control the distribution and nozzles wet the emerging particulates. A gate selectively blocks metering of particulates to one barrel.

18 Claims, 17 Drawing Figures

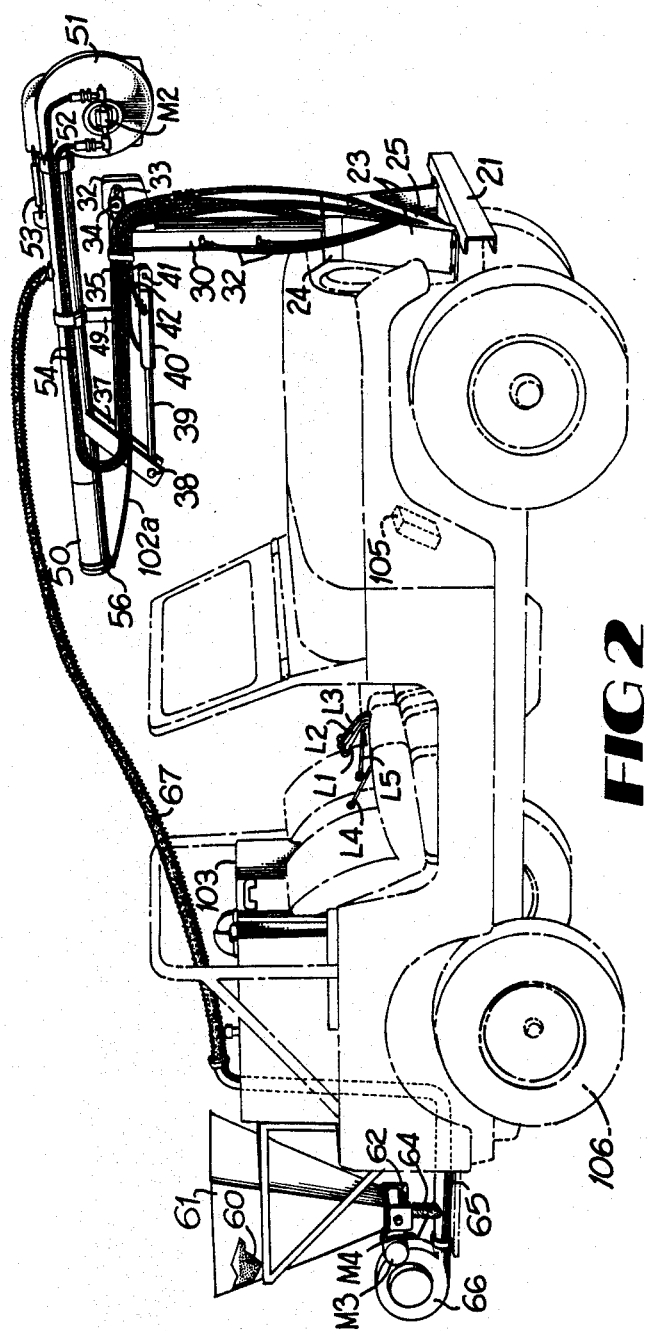
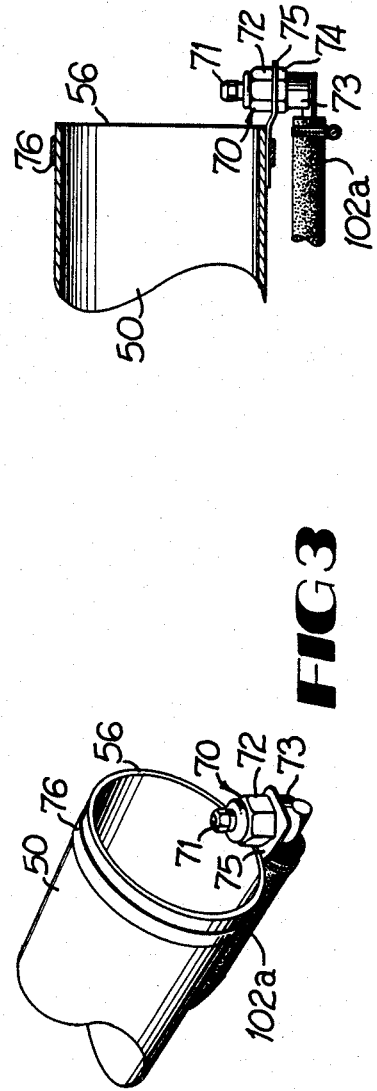

SYSTEM FOR APPLYING PESTICIDES WITHOUT DRIFT

This is a continuation of co-pending application Ser. No. 616,383, filed on May 31, 1984, now abandoned.

BACKGROUND OF THE INVENTION

1. Field of the Invention

This invention relates to a system of applying pesticides without drift and is more particularly concerned with an apparatus and process for the broadcast spraying of particulates.

2. Description of the Prior Art

In the past, the acreage spraying of herbicides has been carried out by spraying devices attached to helicopters, the herbicide being dispensed as liquid discharged through nozzles mounted on the helicopter. Pelleted herbicides have also been dispensed with helicopters by adapting a seeder attachment. Simplex Manufacturing Co. of Portland, Oreg. produces these seeder devices under the name SIMPLEX SEEDER. Recently, the U.S. Government and many companies have barred the use of helicopters for spraying herbicides since the pattern of distribution of the herbicide can be materially altered by the air currents, with the danger of applying the herbicide to the wrong area.

U.S. Pat. No. 2,708,596 discloses a sprayer which uses a centrifugal blower for directing air out of the discharge end of a barrel to entrain liquid delivered by a nozzle to the discharge end. U.S. Pat. No. 3,994,437 teaches using a blower for directing a fluid carrier (air) through a conduit for entraining a plurality of microdispensers which encapsulate biologically active chemicals. This patent also teaches injecting a second material in liquid form into the fluid carrier, the second fluid being another biological agent or a sticker substance adapted to facilitate attachment of the microdispensers to living organisms.

U.S. Pat. No. 2,594,478 discloses an insecticide sprayer in the form of a nozzle which when water passes therethrough, entrains the insecticide. U.S. Pat. No. 3,233,832 teaches the regulating of the volume of a sprayed liquid according to the speed of the vehicle. U.S. Pat. No. 4,111,364 discloses the use of a blower with an air manifold from which diverging conduits extend from the manifold for discharging the herbicide.

The present invention more accurately and evenly dispenses particulates, in a uniform pattern.

SUMMARY OF THE INVENTION

Briefly described, the present invention includes in a first embodiment a wheeled vehicle, such as a roadway vehicle, which carries at its front portion an upstanding standard which is rotatable in either direction through about 360°. The upper end of the standard carries an arm or boom, pivoted about a transverse axis. A piston within the upstanding standard raises and lowers the boom through an arc from a horizontal position to approximately a 70° inclined position. At the end of the arm or boom is a bracket which carries the central portion of a barrel or tube, one end of which is provided with a centrifugal blower which feeds air therethrough and the other end of which is provided with a liquid nozzle. A hydraulic piston and cylinder arrangement tilts the barrel with respect to the end of the boom. A metered stream of particulates are blown to the barrel so that they will be entrained in the blast of air traveling through the barrel. These particulates are stored for delivery in a hopper on the vehicle. Water, or some other wetting fluid, is also carried in a tank on the vehicle and is fed by a pump to the nozzle so that the particles can be wetted and rendered tacky as they emerge from the barrel.

In the second embodiment of the present invention, the wheeled vehicle carries a discharge assembly which is suspended so that it pivots by gravity about a longitudinal axis at the centerline of the vehicle. This discharge assembly carries a pair of barrels, which include parallel horizontal portions extending rearwardly and then curving upwardly for providing upwardly diverging, transversely opposed, discharge portions which discharge in an upwardly and outwardly direction. The inner ends of the barrels or tubes have particulate intake openings and are provided with centrifugal air blowers which blow air through the barrels past the openings so that metered amounts of particulates, delivered to the barrels through metering devices, are entrained in the streams of air and are fed out of the ends of the barrels. At the end of each barrel, a discharge spout is provided, the spout having a pair of diverging passageways through which regulated amounts of the particulates can be directed. The metering device has a partition by which feed to one of the barrels may be shut off. The discharge end portions of the barrels remain in generally an upright position because the center of gravity for the discharge assembly is below the transverse axis about which the discharge assembly swings.

Accordingly, it is an object of the present invention to provide an apparatus and process for broadcast spraying of particulates, the apparatus being inexpensive to manufacture, durable in structure and efficient in operation.

Another object of the present invention is to provide an apparatus and process for broadcast spraying of particulates wherein the pattern of spraying will remain relatively constant and wherein the winds will not appreciably affect this pattern.

Another object of the present invention is to provide an apparatus and process for the broadcast spraying of particulates from a traveling vehicle and wherein the pattern and density of the particulates will remain constant, regardless of the speed of the vehicle.

Other objects, features and advantages of the present invention will become apparent from the following description when taken in conjunction with the accompanying drawings wherein like characters of reference designate corresponding parts throughout the several views.

BRIEF DESCRIPTION OF THE DRAWINGS

FIG. 1 is a front elevational view of the apparatus for broadcast spraying of particulates, constructed in accordance with the present invention;

FIG. 2 is a side elevational view of the apparatus depicted in FIG. 1, the discharge apparatus thereof having a second form of liquid spray nozzle assembly thereon and the vehicle being illustrated in broken lines;

FIG. 3 is an enlarged, fragmentary perspective view of the discharge end of the barrel of the apparatus depicted in FIG. 2;

FIG. 4 is a schematic vertical sectional view of the structure illustrated in FIG. 3;

FIG. 5 is a schematic vertical sectional view of the spray assembly of the apparatus depicted in FIG. 2, but showing a modified form of liquid spray nozzle assembly;

DESCRIPTION OF THE PREFERRED EMBODIMENTS

Figure 1:
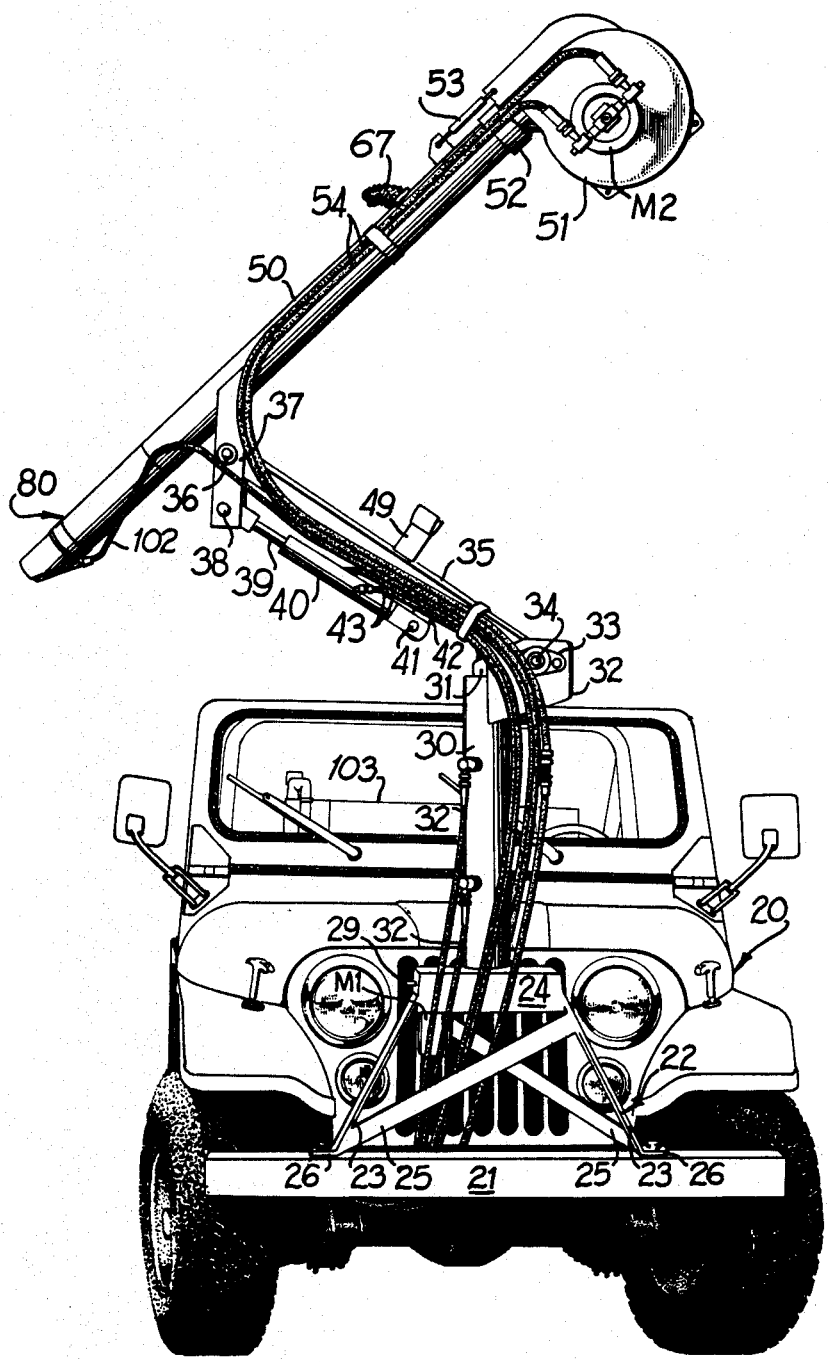

Referring now in detail to the embodiments chosen for the purpose of illustrating the best modes contemplated by the inventors for carrying out the present invention, number 20, in FIGS. 1 and 2, denotes generally a roadway vehicle or other wheeled vehicle. This vehicle 20 has mounted on its front bumper 21, an upright A frame, denoted generally by the numeral 22. This A frame 22 includes a pair of support struts 23 which converge upwardly to support between their upper ends a transverse housing 24. Criss-crossed reinforcing struts 25 extend between the upstanding struts 23. The lower end portions of the struts 23 are bent outwardly to provide feet 26 by which the A frame 22 is secured to the upper surface of the bumper 21.

Carried by and depending from the housing 24 is a hydraulic motor M1 which, through a gear mechanism including shaft 29, rotates an upstanding standard 30 which extends upwardly, terminating above the vehicle 20. The lower end of a mast or standard 30 is journalled by housing 24.

The hydraulic motor M1 receives hydraulic fluid under pressure from a hydraulic source (not shown) through control valves (not shown) which are manipulated by a lever L1, located in the cab of the vehicle. Since the hydraulic system itself is conventional, no detailed description of the valves connected to lever L1 or the hydraulic system is deemed necessary. Suffice it to say that when the lever L1 is pushed in one direction to a first position, the motor M1 will be driven in one direction and when the lever L1 is moved in the opposite direction to a second position, the motor M1 will be rotated in the opposite direction. At a neutral position for lever L1 between the two extreme positions, the motor M1 will not be operated. There are stops which prevent the motor M1 from driving the mast 30 more than about 360° about its vertical axis. Thus, the hydraulic lines, which will be described hereinafter, cannot become wrapped around the mast or standard 30 to any appreciable extent.

Within the hollow interior of the upstanding standard 30 is a cylinder (not shown) which extends and contracts a piston rod 31, which protrudes from the upper end of mast or standard 30. Hydraulic lines 32 supply hydraulic fluid to the cylinder for raising or lowering the piston rod 31, as desired. The valves (not shown) controlling the flow of hydraulic fluid through lines 32 are connected to the lever L2 which is mounted adjacent to lever L1. By manipulation of lever L2, the piston 31 may be extended or contracted or may be maintained in its prescribed position, as desired.

Positioned to one side of the piston rod 31 and fixed by its inner end to the upper end portion of the mast 30 is a housing 32 which carries pillow blocks, such as pillow block 33, which journal a pivot shaft 34 carried at the end of the arm or boom 35. The upper end of piston rod 31 is pivotally connected to an intermediate portion of boom 35 so that it can pivot about the transverse or horizontal axis of shaft 34 from an essentially horizontal position to a position approximately 70° from the horizontal. This arm of boom 35 protrudes outwardly from pivot shaft 34 and is provided at its outer end portion with a transverse pilot shaft 36 which pivotally carries the central portions of a pair of opposed levers or brackets 37. These levers or brackets 37 carry, at their lower opposed ends, a transverse pivot pin 38 connected to the end of a piston 39 of a double acting hydraulic cylinder 40. The lower end portion of the cylinder 40 is connected to a pivot pin 41 carried by a downwardly protruding bracket 42 on the arm or boom 35. Hydraulic lines or conduits 43 supply hydraulic fluid for the manipulation of the piston 39 by the cylinder 40. Hydraulic fluid to these hydraulic lines 43 is controlled by a lever L3 positioned in the cab adjacent to lever L2. Thus, the manipulation of lever L3 will cause the hydraulic fluid selectively to extend piston rod 39, or retract piston rod 39, or maintain piston rod 39 in a fixed position.

The other end portion or upper end portion of the levers or brackets 37 are fixed to opposite sides of a barrel or air tube 50 at an intermediate position from its ends. Barrel 50 is an air conduit which is a straight, hollow, cylindrical, tubular member, essentially open at both ends. One end, the proximal end, of tube 50 is provided with a centrifugal air blower or impeller 51 which has a coupling 52 affixed to the discharge end of the blower 51. This coupling 52 is removably received over the proximal end portion of the barrel 50 and the blower 51 is removably retained thereon by a turnbuckle 53 which extends between the barrel 50 and a portion of the blower 51. The blades of blower 51 are rotated by a hydraulic motor M2, hydraulic liquid being fed to the motor M2 by hydraulic lines 54. Hydraulic fluid to the motor M2 is supplied by a valve (not shown) which is controlled by the lever L4, shown in FIG. 2. When motor M2 is cut on, the blower 51 is rotated to direct air out of the discharge end of the blower 51 and through the barrel 50, the air being discharged out of the discharge end 56 of the barrel 50.

Figure 12:
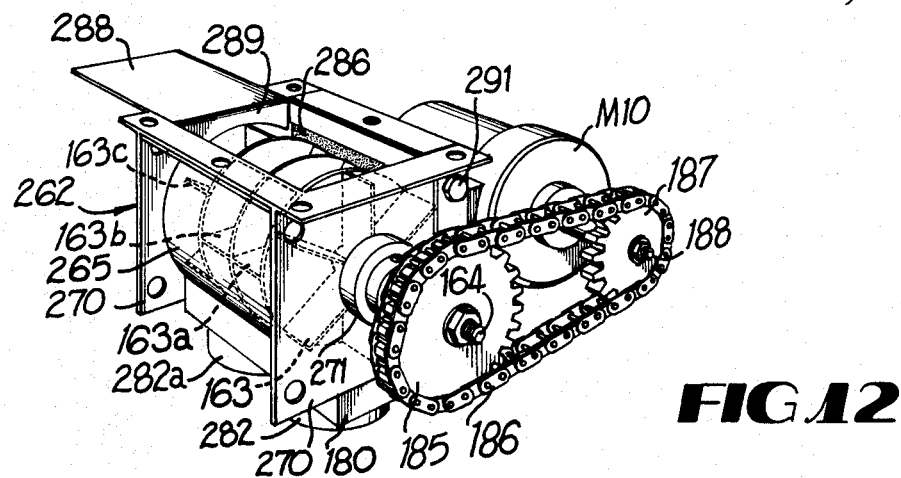
FIG. 12 is an enlarged perspective view of the metering device of the structure shown in FIGS. 10 and 11.
Figure 13:
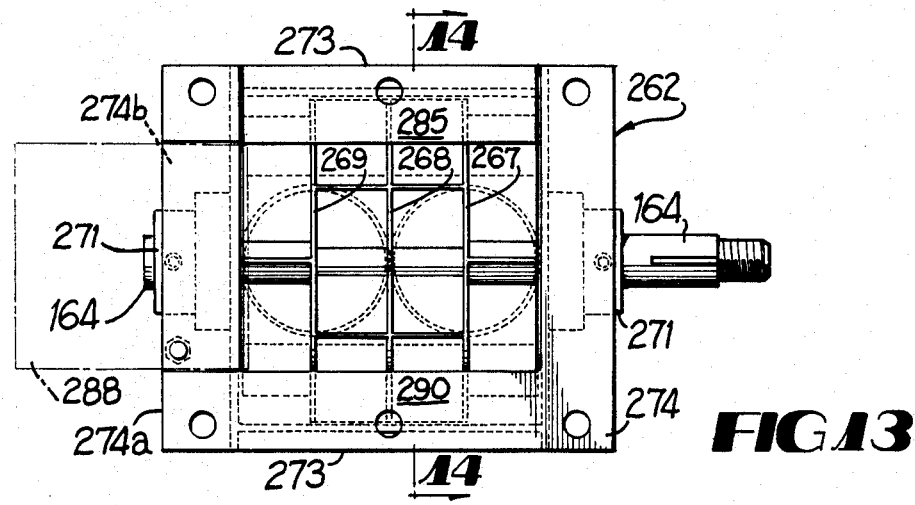
FIG. 13 is a top plan view of the metering device shown in FIG. 12.
Figure 14:
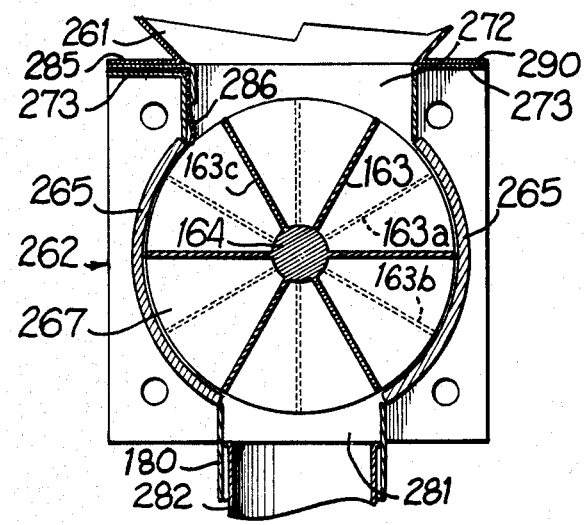
FIG. 14 is an enlarged fragmentary view of the metering device shown in FIGS. 12 and 13.

The particulates, denoted generally by the numeral 60 (FIG. 5), which are to be discharged by being contained in the air passing through barrels 50 are stored in an inverted pyramid shaped hopper 61. The hopper 61 has a bottom opening through which the particulates feed to a metering device 62 which is driven by a motor M3. The metering device 62 is similar to the metering device 162 which is seen in FIGS. 12, 13 and 14. The metering devices 62, 162 have radially extending paddles 163 extending from a transverse shaft 164 so that when the shaft 164 is rotated, measured successive amounts of particulate material are delivered downwardly by the paddles 163.

Figure 5:
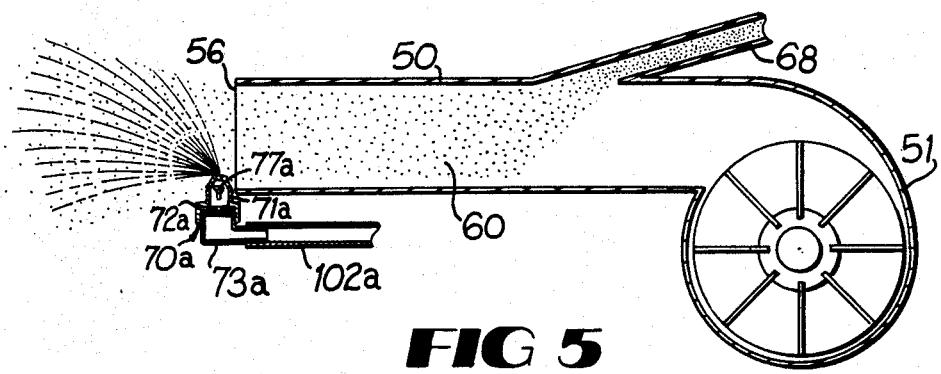
Figure 6:
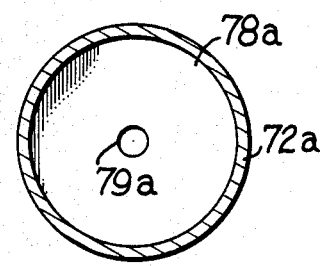
FIG. 6 is an enlarged vertical sectional view of a portion of the liquid spray nozzle assembly, depicted in FIG. 5.
Figure 7:
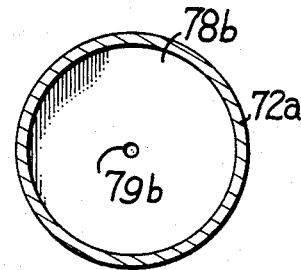
FIG. 7 is a vertical sectional view of a modified form of a portion of the spray nozzle assembly, depicted in FIGS. 3, 4 and 5.

When the motor M3 rotates the shaft of the metering device 62 of the first embodiment the metering device 62 delivers the particulate material 60 into a discharge conduit 64 which feeds into a horizontally disposed pipe 65. The particulate material 60 is then entrained in air fed through pipe 65 by a centrifugal air blower 66 on end of pipe 65. The discharge end of the pipe 65 is provided with a flexible hose or conduit 67 which delivers the air and entrained particulates 60 to an intake pipe 68, mounted angularly on tube 50 and communicating therewith, as seen in FIG. 5. Thus, the air delivered by the blower 66, with the entrained particulates 60, which are introduced into tube 50 through pipe 68, are commingled with the air generated by the blower 51, the particulates 60 being finely divided and being delivered as a column in the exiting air, out of the exit opening 56.

As best seen in FIGS. 3, 4 and 5, a liquid nozzle assembly, denoted generally by the numeral 70, is disposed outwardly adjacent to the exit opening 56. This nozzle assembly 70 comprises a sprayer or nipple head 71 which is threadedly received in the small end of a coupling 72, the larger end of which, in turn, is threadedly received on the upper end of a reducing elbow 73. The elbow 73 also has a retaining nut 74 which is threadedly received on the larger portion of the elbow 73 so that the nut 74 and the coupling 72 sandwich a mounting plate 75, therebetween.

As best seen in FIG. 4, the mounting plate 75 is slightly offset to provide a rearwardly extending tongue portion of the mounting plate, around which a strap 76 passes, the strap also extending circumferentially around the end portion of pipe or barrel 50. Thus, the nozzle 70 is mounted so that the nipple 71 is within the column of air emerging from barrel 50 in front of the discharge opening of end 56. The liquid is discharged through the nipple 71 inwardly in a radial direction, being sprayed generally toward the axis of the emerging stream of air and particulates. By such an arrangement, the nipple 71 directs a spray of liquid (water) inwardly so that it forms droplets which collide with the particulates as they are carried by the air, outwardly.

As best seen in FIG. 5, a modified form of assembly nozzle 70a can be provided, if desired. This nozzle assembly 70a has a nipple portion 71a and an elbow 73a. The nozzle 70a has a widened base 72a which is threadedly received on the elbow 73a. The elbow 73a is connected to the conduit 67, in place of the nozzle 70. Within the interior of the nipple 71a is a diffusion element 77a which permits the passage of liquid around the diffusion element 77a before it is discharged out of the opening at the inner end of the nipple 71a.

Inserted in the base 72a is a regulator wafer or disc 78a or 78b, the wafer of 78b having a smaller diameter central opening 79b and the wafer 78a having a larger diameter opening 79a. The tightening of the base 72a on the elbow 73a clamps the wafer 78a or 78b, as the case may be, in places shown in FIG. 5 for wafer 78a. The size of the opening 79a or 79b determines the amount of liquid to be delivered by the nipple 71a. Any suitable means may be employed for supporting the nozzle assembly 70 in the location indicated in FIG. 5.

Figure 8:
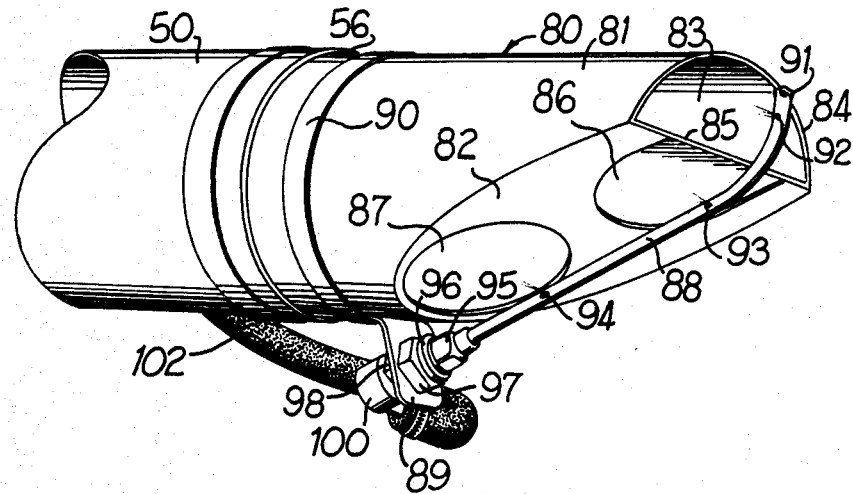
FIG. 8 is an enlarged fragmentary perspective view of the discharge end of the form of the barrel of spray nozzle assembly, depicted in FIG. 1.

In FIGS. 1 and 8 is illustrated a modified spray nozzle assembly formed by a pattern diffusion cap or spout 80 which is telescopically received in the end portion of end 56 of barrel 50. This dissusion cap 80 comprises a hollow cylindrical tubular body 81, the front portion of which is partially closed by an inclined, flat, forwardly and inwardly extending, baffle plate 82 which extends at an angle to the axis of the body 81, thereby progressively closing about one-half of the mouth of the body 81 so as to provide a radially disposed discharge opening 83, defined by a semicircular peripheral edge 84 of body 81 and a straight forward edge 85 of plate 82. The plate 82 is also provided, adjacent to edge 85, with a semicircular half-moon opening 86, defined by a curved portion of plate 82 which is spaced from the edge 85. Plate 82 also has a circular discharge opening 87 which is spaced from the opening 86 and from the inner edge portion of the plate 82.

Outwardly of these openings 83, 86 and 87, and outwardly of and parallel to plate 82 is liquid spray nozzle 88 which is carried by a bracket 89 held on the inner end portion of the tube 81 by a circumferentially extending strap 90. In more detail, the nozzle 88 is a hollow tubular member closed at its outer end 91 and provided with sidewise discharging spray openings 92, 93 and 94 which are respectively disposed in front of the openings 83, 86 and 87. The proximal end of nozzle 88 is provided with an internally threaded nipple 95 which is received on a coupling 96, the coupling 96 extending through the bracket 89 and being locked thereon by nuts 97 and 98. An elbow 100 connected to the discharge end of a flexible hose 102, the other end of the hose being connected to a pump (not shown) by which water under pressure from tank 103 carried by the vehicle 20 is supplied to the hose 102.

In FIGS. 2 through 5 the hose, which supplies water or other wetting liquid to the elbow 73 or 73a, is designated by the numeral 102a. Lever L5 is an on-off lever which controls the pump (not shown) for supplying water to the tube 102 or 102a, as the case may be. Preferably this water pump is driven by a hydraulic motor that is controlled by lever L5. A hydraulic pump (not shown) is connected through an electric clutch (not shown) on the vehicle engine, to provide hydraulic fluid to levers L1 thru L5. This electric clutch is controlled by a separate switch (not shown). A pressure regulator (not shown) at the water pump, controls the volume of liquid delivered to the nozzle 88.

When the spraying assembly described in FIGS. 1 through 8 is not in use, the boom 35 is disposed in a horizontal position and the piston rod 39 is fully extended so that the barrel 50 is received on an upstanding Y shaped cradle 49, as illustrated in FIG. 2. Also, mast or standard 30 is rotated so that the boom 35 and the barrel 50 are aligned along the longitudinal axis of the vehicle 20. When, however, it is desired to utilize the spraying assembly, the levers L1, L2, and L3, are manipulated so as to point the barrel 50 in a prescribed direction. Then levers L4 and L5 are manipulated to commence discharging the particulates. The rotation of the barrel 50 about a vertical axis is achieved by rotation of the mast 30 through manipulation of the lever L1. The raising and lowering of the boom arm 30 is achieved by manipulation of the lever L2. The tilting of the barrel 50 is accomplished by manipulation of lever L3. Once the barrel 50 has been appropriately aimed, the main blower 51 is turned on through manipulation of the lever L4 and the delivery of water or other wetting liquid to the nozzle of barrel 50 is controlled by the lever L5.

On-off switches control motors M3 and M4 for the delivery of particulates from the hopper 61 to the barrel 50. If desired, the speed of motor M3 which regulates the quantity of particulates to be delivered, can be connected to a suitable speed control mechanism denoted by the numeral 105 so that the speed of the motor M3 will be proportional to the speed of travel of the vehicle 20 over the ground. Such controls are known as transducers and are conventional. Hence, no more detailed description of the speed control for motor M3 is needed. Suffice it to say that the speed control is driven from the drive shaft of the vehicle 20, the drive shaft driving the wheels 106. Thus, regardless of the speed of the vehicle 50, the density of the pattern of the broadcast and the degree of wetting, if any, can be maintained, as constant, for the area being aprayed.

Figure 9:
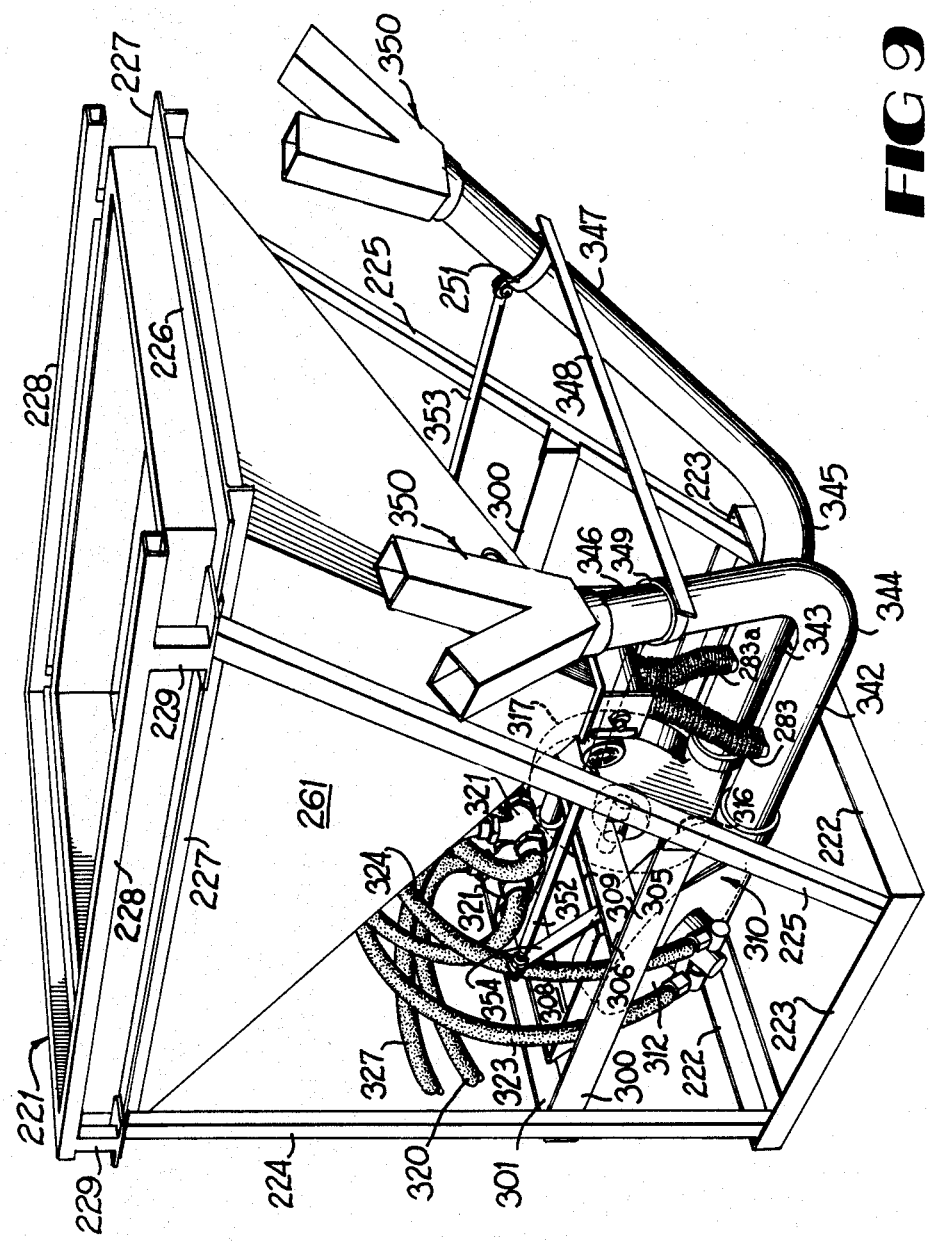
FIG. 9 is an enlarged perspective view of the second embodiment of the present invention.
Figure 10:
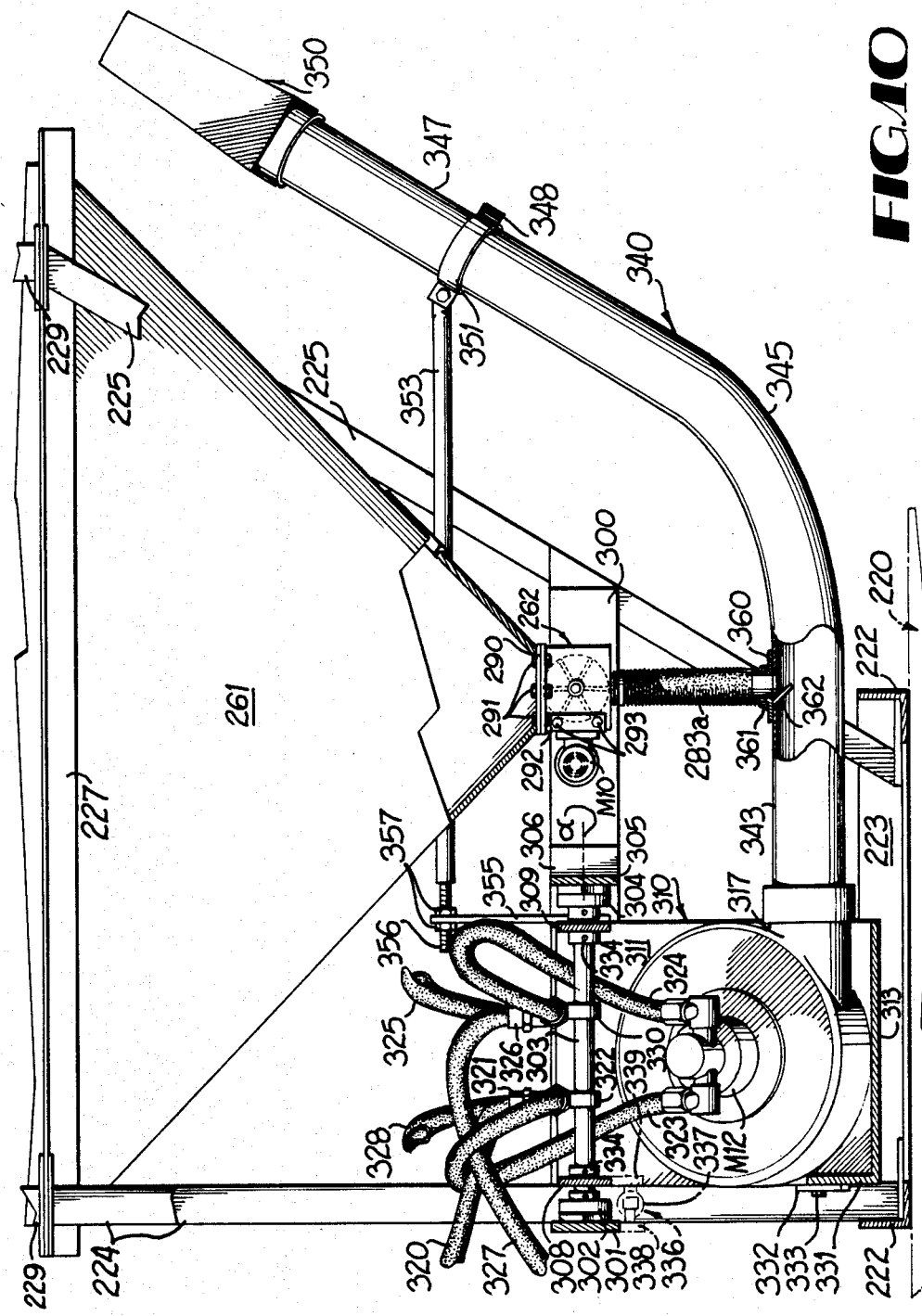
FIG. 10 is a side elevational view of the discharge assembly of the apparatus shown in FIG. 9.
Figure 11:
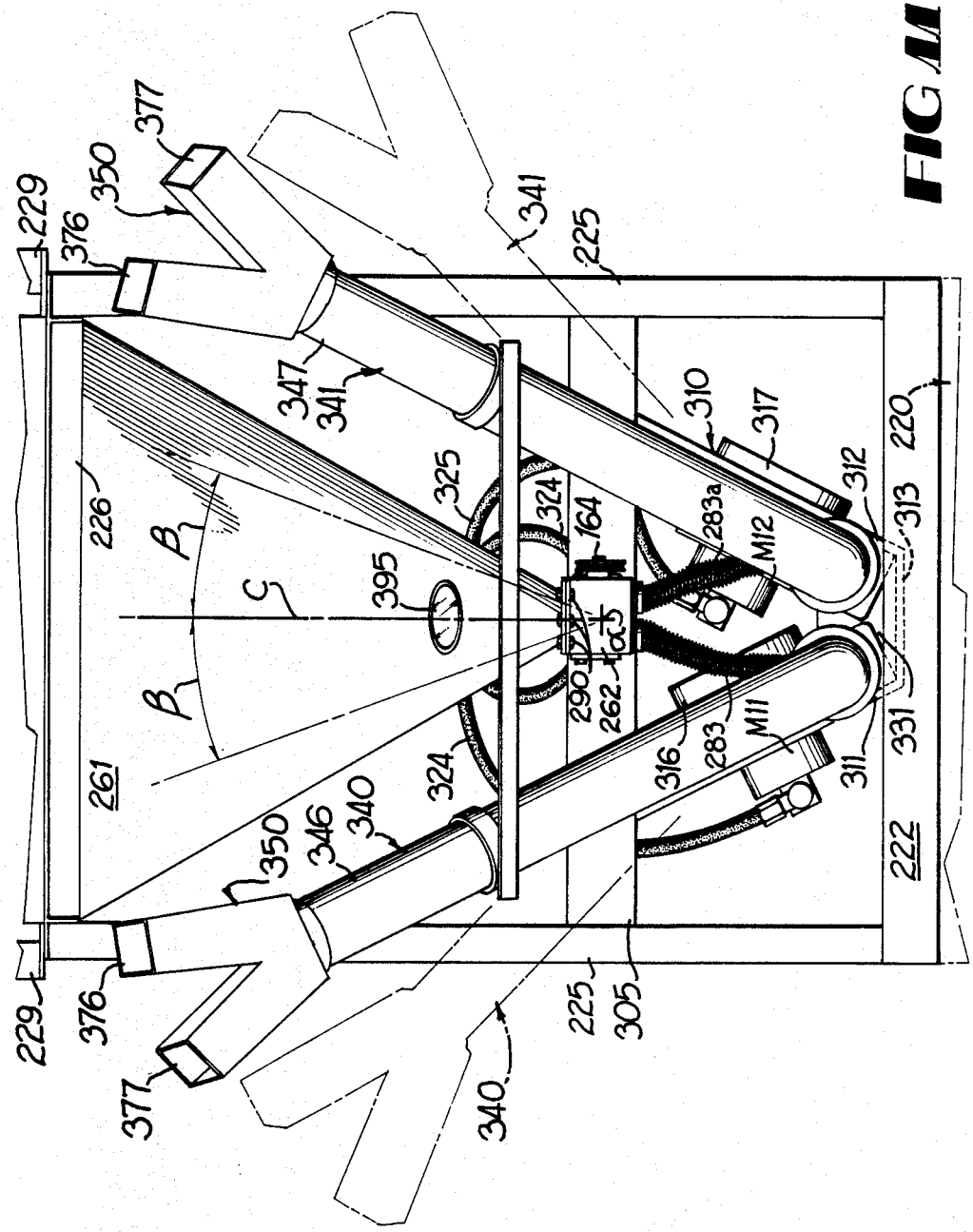
FIG. 11 is an end view of the apparatus shown in FIG. 10.

In the second embodiment of the present invention as illustrated in FIGS. 9 through 17, the spraying assembly 221 is mounted on a wheeled vehicle, denoted by the numeral 220. This wheeled vehicle is known as a "skid" and is used primarily in the forest industry trade for traveling over rough land, such as land the trees of which have been harvested. Preferably, the spraying assembly 221 is mounted on the rear of the skid 220. As best seen in FIGS. 11, 12 and 13, the spraying assembly 221 includes a rigid support frame having a base frame provided with transverse struts 222 and longitudinal struts 223, struts 223 joining the ends of the struts 222. Opposed, parallel, upstanding front hopper support struts 224 extend upwardly from the front corners of the base frame, while upstanding rearwardly and upwardly extending rear hopper support struts 225 extend from the rear corners of the base frame. The upper ends of the struts 224 and 225 support a horizontally disposed upper frame which includes transverse upper struts 226 and longitudinally extending upper struts 227, this upper frame being disposed parallel to and above the lower frame formed by struts 222 and 223.

An inverted pyramid shaped hopper 261 is suspended by the upper frame formed by struts 226 and 227. Its walls taper downwardly to a discharge opening surrounded by a rectangular mounting frame 290. A guide rail is provided around three sides of the upper end portion of hopper 261, this guide rail 228 being supported from the upper frame by upstanding legs 229.

Supported wholly by frame 290 is a metering assembly 262 by means of which measured amounts of particulates are discharged from the hopper in two separate side-by-side paths. This metering assembly 262 includes a housing having a pair of opposed arcuate sides 265 which are in spaced opposed relationship, being concentric about a transverse, horizontal central shaft 164. End plates 270 join the ends of the side 265 and are provided with bearings 271 which journal the shaft 164. Protruding upwardly from the sides 265 are a pair of opposed angle irons 273 forming passageway plates which, with the ends 270, provide an intake passageway 272. The upper end portions of these angle irons 273 extend outwardly to provide flanges which are in a common plane with end flange 274 on one of the end plates 270 to define part of an upper frame surrounding a portion of the passageway 272. The other flange 274a of the other end plate is provided with a central trough 274b for purpose to be described later.

Mounted at spaced intervals along the length of the shaft 164 are three circular partitioned discs 267, 268 and 269. These partitioned discs, in cooperation with the end plates 270 define four separate juxtaposed discharge compartments of about equal volume.

Radiating from the shaft 164 into each compartment, defined by the discs 267, 268, 269 and the end plates 270, are a plurality of circumferentially spaced radially extending paddle blades, the paddle blades in the first compartment being designated by the numeral 163, the paddle blades in the second compartment being designated by the numeral 163a, the paddle wheels in the third compartment being designated by the numerals 163b and the paddle blades in the fourth compartment being designated by the numeral 163c. Preferably, there are six equally spaced blades in each compartment, the blades 163 and 163c being aligned axially and the blades 163a and 163b being aligned axially. The blades 163 and 163a are offset from each other as the blades 163b and 163c so that the blades 163a and 163b are in a plane which bisects the angle between the plane of adjacent blades 163 and the angle between adjacent blades 163c. Upon rotation of shaft 164, the feed of the blades 163 and 163a alternately drop measured quantities of particulatesin a first path. Blades 163b and 163c alternately drop their particulates, in a second path.

Extending from the lower ends of the arcuate sides 265 is a rectangular tubular frame 180 which carries a central partition 281 having an arcuate upper edge which is closely adjacent to the lower periphery of the discs 268. Thus, the discharge of the blades 163 and 163a pass on one side of partition 281 while the discharge of blades 163b and 163c pass on the other side of the partition 281. This partition separates the feed paths of the metering device into two streams. The frame 180 carries a pair of downwardly extending, juxtaposed discharge ducts 282 and 282a which respectively receive the two discharges. The lower ends of the ducts 282 and 282a extend below the frame 180 and receive the upper ends of flexible hoses or conduits 283 and 283a, seen in FIGS. 9, 10 and 11.

As best seen in FIGS. 12 and 14, an angle iron 285 extends over one of the flanges 273 to sandwich therebetween, one edge of a resilient, leather or gasket fabric material which forms a bumper 286 in the passageway 272. This bumper 286 prevents appreciable destruction of the pellets which may form the particulates fed through the metering assembly or device 262, from being broken up by the paddle blades.

For rotating the shaft 164, there is provided a sprocket 185 driven by a continuous chain 186 from a second sprocket 187 mounted on the end of a shaft 188 of motor M10. The motor M10 is a variable speed 12 volt DC electric motor the speed of which is controlled by a transducer, such as transducer 105 in FIG. 2, so that motor M10 will rotate at a speed proportional to the speed of the vehicle 220 over the land. Thus, when the vehicle 220 is stopped, motor M10 is also stopped while, when the vehicle 220 is moved slowly, the motor M10 rotates shaft 188 relatively slowly. As the speed of the vehicle 220 increases, the speed of rotation of shaft 188 is also progressively increased.

As seen in FIG. 12, a slide plate or partition 288 is provided on the upper flange 274 so that it can manually be moved over the mouth of the intake passageway 272 and thereby close off the paddle blades of the last two compartments, namely, blades 163c and 163b. Thus, when the slide plate 288 is moved inwardly, in FIGS. 12 and 13, its downwardly extending flange 289 and the plate 288 will prevent the particulates from being fed to and discharged by the paddle wheels 163b and 163c. This slide plate 288 is operated manually when it is desired to spray from only a single discharge barrel, rather than the two barrels, as will be described hereinafter.

The metering device or assembly 262 is suspended from and supported solely by the hopper 261, the flanges 273, 274, 274a being bolted, by bolts 291, to the frame 290, as shown in FIG. 10. A bracket 292 secures the motor M10 to the metering device 262 as shown in FIGS. 10 and 12. Bolts 293 secure bracket 292 in place.

Between the upper frame, defined by struts 227 and 228, and the lower frame, defined by struts 222 and 223, is an intermediate horizontal frame which includes a pair of longitudinally extending straps 300 which respectively extend between intermediate portions of the struts 224 and 225. A transversely extending bearing supporting bar 301 forms the front strut of this intermediate frame, the bar 301 extending between the ends of straps 300, projecting horizontally between intermediate portions of the opposed upright struts 224, as seen in FIGS. 10 and 11. As seen in FIG. 12, this front bar 301, at its central portion is provided with a pillow block 302 which journals for rotation a centrally disposed, longitudinally extending, rocker shaft 303. A second pillow block 304 is carried by a cross bar 305 which extends between intermediate portions of the straps 300. Flanges 306 on the ends of the bar 305 are fixed to the inner surfaces of the straps 300. Thus, the ends of shaft 303 are supported rigidly for rotation about a longitudinal horizontal axis, by the pillow blocks 302 and 304.

Inwardly of the pillow blocks 302 and 304 and fixed on shaft 303 are a pair of spaced, parallel, transversely extending, cross bars 308 and 309. These cross bars 308, 309 terminate inwardly of the straps 300 and support a U-shaped downwardly extending, blower supporting sling or cradle, denoted generally by the numeral 310. In more detail, this sling 310 is formed of sheet metal and includes a pair of flat, rectangular, transversely opposed, downwardly and inwardly converging, sheet metal plates 311 and 312. These sheet metal plates 311 and 312 are provided with central holes through which the hydraulic motors M11 and M12 project. The bottom portions of the plates 311 and 312 are joined by a rectangular base 313, shown in broken lines in FIG. 11. Motors M11 and M12 are respectively mounted to the plates 311 and 312. The upper end portions of the plates 311 and 312 are carried respectively by the ends of the cross bars 308 and 309.

Mounted on the opposite or inner side of plate 311 from motor M11 is a centrifugal air blower or impeller 316 which is driven by the motor M11, the motor projecting through the hole in the plate 311. In similar fashion, a centrifugal air blower or impeller 317 on the outer side of plate 312 is driven by the motor M12 which projects through the hole in the plate 312. Hydraulic fluid for driving the motors M11 and M12 is supplied through hydraulic supply hose or line 320 to a T-coupling 321 mounted by bracket 322 on the shaft 303, the T-coupling 321 discharging simultaneously to hydraulic supply lines 323 and 328, which lead respectively to the motors M11 and M12. Thus, when the hydraulic fluid is fed through supply line 320, it simultaneously rotates both motors M11 and M12 at essentially equal speed. Return of the hydraulic fluid is through the return hydraulic lines 324 and 325 which lead from the motors M11 and M12, respectively. These lines 324 and 325 connect to a T-coupling 326 which feeds to a return hydraulic line 327 leading to a hydraulic sump tank (not shown). The T-coupling 326 is clamped by clamp 330 on the shaft 303.

A front plate 331, seen in FIG. 10, extends between the lower end portions of the plates 311 and 312 and is connected by its edge to the edge of plate 310. A balancing weight 332 is mounted by bolt 333 to the back plate 331 so that when the bolt 333 is loosened, this balancing weight 332 can be manipulated, i.e., rotated so as to shift the center of gravity of the discharge assembly laterally, as desired. This laterally adjustable weight 332 can either be an eccentric weight or a weight with a central slot through which the bolt 333 projects.

Collars 334 which are fixed to cross bars 308 and 309 have set screws for engaging shaft 303 to prevent shifting of the bars 308 and 309 on shaft 303.

Shown in broken lines in FIG. 10 is a shock absorber or damper system, denoted generally by the numeral 336, which resists rapid rocking of the cradle 310, by damping the oscillations of the discharge assembly. In more detail, the damper 336 includes a conventional automotive shock absorber 337, one end of which is connected to the lower end of an arm 338, rigidly connected by its upper end to and extending from the central portion of the bar 301, while the other end of the shock absorber 337 is connected to the lower end of an arm 339 which extends down from the central portion of the crossbar 308.

Protruding rearwardly from the discharge ends of the blowers 316 and 317 are a pair of hollow cylindrical tubular discharge barrels or air tubes 340 and 341. These discharge barrels or tubes 340 and 341 include straight parallel rearwardly extending proximal tube portions 342 and 343. These tube portions 342 and 343 pass beneath the metering device 262 and then are curved upwardly to provide intermediate elbows 344 and 345, respectively. Thence, the barrels or discharge tubes 340 and 341 are provided with straight upwardly and rearwardly extending discharge distal portions 346 and 347 which diverge from each other, as shown in FIGS. 9 and 11. The discharge ends of the distal portions 346 and 347 are provided with discharge diffusion spouts 350 which bifurcate the flow from the discharge portions of 346 and 347. The construction and operation of the discharge spouts will be discussed hereinafter.

Connecting the discharge end portions 346 and 347 is a transverse cross bar 348 which is connected at its end portions to a pair of collars 349 and 351, the collars extending respectively around the discharge end portions 346 and 347, as seen in FIGS. 9 and 11. The collars 349 and 351 respectively receive the ends of longitudinally extending support bars 352 and 353, the other ends of the bars 352 and 353 being connected to arresting arms 354 and 355, the lower ends of which are connected to the cross bar 309. Preferably, the ends of the support bars 352 and 353 are connected to their respective arms 354 and 355 by take-up bolts, such as bolt 356 which projects from the end of bar 353 and receives nuts 357 on opposite sides of the srm 355. By manipulation of the nut 357, the length of the bar 353 can be adjusted, as desired.

The lower ends of the flexible conduits 283 and 283a are connected respectively to the upper peripheries of the horizontally extending, proximal tube portions 343 and 344, as shown for conduit 283a in FIG. 10. For this purpose, a butt flange and sleeve coupling 360 is used, to which the lower end of conduit 283a is secured by a circumferential clamp 361. Coupling 360 defines a particulate intake opening for the tube portion of 343 and conduit 283a communicates, therewith.

Each of the tube portions 342 and 343 is provided with an inwardly and forwardly inclined baffle, such as baffle 362, disposed within the tube portion of 343 seen in FIG. 10. This baffle 362 protrudes angularly downwardly and rearwardly below the opening in the coupling 360 so that an area of low pressure is generated for drawing or asperating the particulate from conduit 283 into the blast of air which is directed along the barrel or air tube 340.

Figure 15:
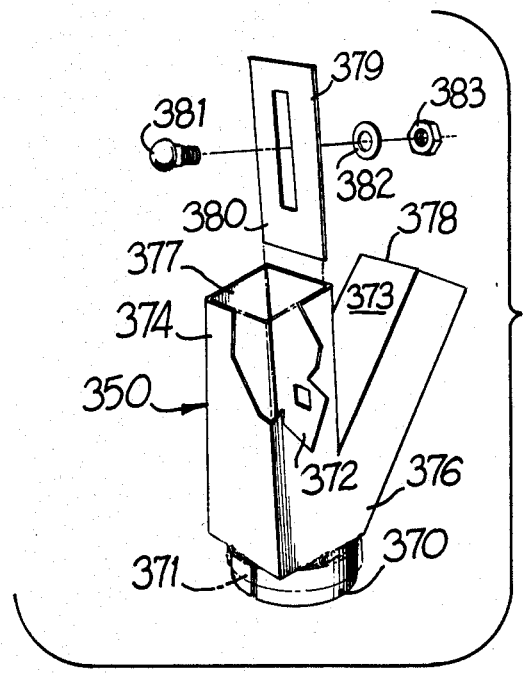
FIG. 15 is an enlarged view of the bifurcated discharge spout of one of the barrels of the device depicted in FIGS. 9 through 14.
Figure 16:
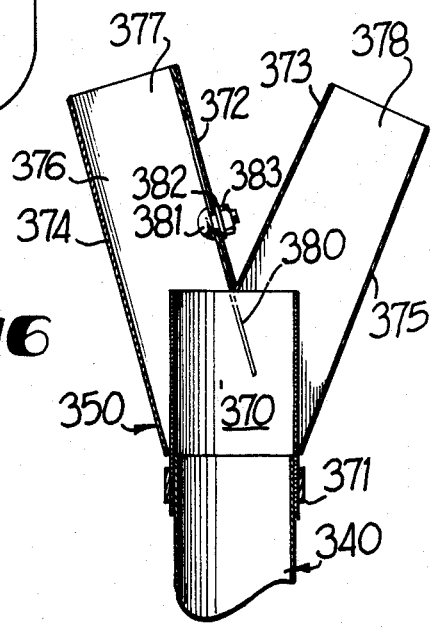
FIG. 16 is a vertical sectional view of the structure depicted in FIG. 15.

As best seen in FIGS. 15 and 16, each of the discharge spouts 350 is produced utilizing a cylindrical tubular sleeve 370 which is of a diameter slightly larger than the outside diameter of the discharge end of the tube or barrel 340 or 341, as the case may be. Thus, one end portion of the sleeve 370 can be telescopically received by and totally retained on the discharge end portion of the barrel or tube 340 or 341. A clamp 371 extends around sleeve 370 so as to firmly hold it in place.

As best seen in FIG. 16, in front of sleeve 370 are a pair of outwardly diverging, rectangular air directing plates 372 and 373 which extend outwardly from a common apex which extends diametrically across and is spaced from the end of sleeve 370. Generally parallel or tapering outwardly of the plates 372 and 373 are, respectively, plates 374 and 375. These plates 374 and 375 are fixed to an intermediate portion of the sleeve 370. Bifurcated, opposed, parallel, side plates 376 join the edges of the plates 372, 373, 374 and 375. The are defined by the corner portions of these plates and sleeve 370 are open and the plates themselves define passageways 377 and 378 which discharge in upwardly diverging paths. Mounted on the inner surface of plate 372, for slidable movement, is a rectangular baffle 379 which is provided with a central slot 380 through which a bolt 381 passes, the bolt 381 also passing through a hole in the plate 372 and being provided with a washer 382 and a nut 383. When the bolt 381 is loosened, the lower end portion of the baffle 379 can be moved partially into the mouth of the sleeve 370 so as to divert a larger or lesser portion of the air and particulate emerging from tube 340 into the passageway 377. When the machine is in operation, the two discharge spouts 350 are arranged so that their passageways 377 and 378 are in transverse alignment. Thus, a uniform distribution of the particulates carried by the blasts of air, is provided.

Figure 17:
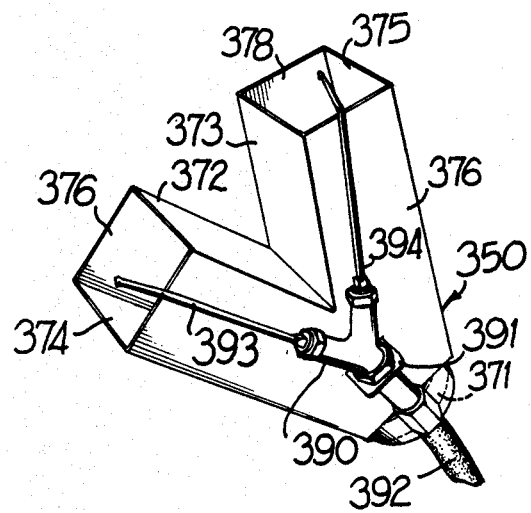
FIG. 17 is a view of the device shown in FIGS. 15 and 16, modified by the addition thereto of a nozzle assembly for wetting the particulates discharged from the spout.

In FIG. 17, it will be seen that, if desired, nozzles can be mounted on the discharge spout 350. This nozzle is provided along one of the side plates 376 and has a Y-shaped coupling 390 which is mounted by a bracket 391 to the side plate 376. The inlet of the Y-coupling 390 is connected to a liquid delivery hose 392. Liquid is delivered to the delivery hose 392 in the same manner as described for the liquid delivered to the hose 102 or 102a. Connected to the diverging ends of the Y-coupling 390 are a pair of L shaped, outwardly diverging, liquid delivery tubes 393 and 394. These tubes 393 and 394, respectively, pass outwardly beyond the discharge end of the passageways 377 and 378 and are bent inwardly so as to extend partially in front of the discharge openings of the passageways. The ends of the tubes 393 and 394 from nozzles which spray the liquid, such as water, into the central portion of the emerging air and particulates passing through the passageways 377 and 378 so as to wet the particulates immediately after they emerge from the discharge ends.

Since the hydraulic systems on tractors is well known, the hydraulic pump for providing liquid to the motors M10 and M11 and the sump tank for receiving the return hydraulic fluid, have not been illustrated, nor have the valves been illustrated which control the amount of liquid delivered to the motors M11 and M12.

There is a sight glass 395, as seen in FIGS. 9 and 11, by which the level of the particulate material in the hopper 261 can be determined.

In operation, the motors M11 and M12 are operated so as to rotate the blades of the centrifugal blowers 316 and 317 for delivering continuous blasts of air through the barrels or air tubes 340 and 341, respectively. This air emerges from the discharge ends of the passageways 377 and 378 of the discharge spouts 350 on the ends of the barrels or tubes 340 and 341. When it is desired to deliver particulates from the hopper 261, the motor M10 is operated so as to rotate shaft 164 and cause the paddle brackets 163, 163*a*, 163*b* and 163*d* to be moved in an orbital path by the shaft 164 and thereby deliver measured and equal amounts of the particulates from the discharge mouth of the hopper 261 into the flexible conduits 283 and 283*a*, respectively. Thence, these conduits 283 and 283*a* deliver the particulates into the blast of air in their respective tubes 340 and 341. Thus, generally equal amounts of the particulates and air are discharged from the passageways 377 and 378 of the respective discharge spouts 350.

It will be remembered that the speed of rotation of motor M10 is controlled by a transducer, such as transducer 105 in FIG. 2, and therefore, the quantity (volume) of particulates is regulated so as to be proportional to the speed at which the vehicle 220 moves over the ground.

Because of the pivotal mounting along the axis of shaft 303 (FIGS. 10 and 11), gravity holds the discharge assembly (which includes blowers 316 and 317 and their discharge tubes or barrels 340 and 341) upright and permits this discharge assembly to swing by gravity, as a pendulum, so as to maintain this discharge assembly in an upright position even though the vehicle 220 is inclined. The arc of swinging from the vertical centerline C in FIG. 11 and the amount of movement of the discharge tubes 340 and 341 is depicted in broken lines in FIG. 11. Thus, when traveling over a rough or irregular terrain, the discharge assembly should be essentially upright, regardless of the inclination or tilt of the vehicle 220.

When desired, water can be delivered through hose 392 so that droplets of water are sprayed onto the particulates discharged out of the passageways 377 and 378 (see FIG. 17). This water will render the particulates tacky so that they readily stick to the leaves or foilage. Of course, at times it is desirable to spray or broadcast ground activated pellets in a dry state. The machine of the present invention will deliver particulates of any size of up to about ½ inch in diameter. Preferably, these particulates are pellets of bioactive chemicals such as herbicides, insecticides, defoliants, fertilizers, or the like. The wetting of the particulates immediately after their emergence from the machine will assure that the pellets are in a surface wet condition but not appreciably deteriorated and will also assure that the particulates do not appreciably reaglomerate. Such particulates will stick to the leaves or foilage and thereby provide effective protection or effective defoliation, as the case may be.

In field tests of the machine of the first embodiment depicted herein, the device could deliver a liquid mist for the spraying of trees to a height of about forty feet using a liquid and air alone, i.e., without any particulates being fed to the barrel or air tubes.

With respect to the second embodiment, when the vehicle 220 moves along its prescribed path of travel over the ground, and the blowers and metering device are operating, the blowers deliver streams of air through the barrels 240 and 241 in upwardly and outwardly diverging paths to opposite sides of the path of travel. The particulates then fall by gravity from the air streams onto the ground or foliage. Using pellets in the second embodiment these dry pellets were delivered quite uniformly over a ninety foot swath by the two barrels or air tubes 240 and 241.

These machines can quite adequately broadcast extruded or shaped pellets having a major diameter of from about 1/16 inch to about ½ inch. Also, granules which are usually of a smaller diameter than 1/16 inch are suitable for being dispensed.

It will be obvious to those skilled in the art that many variations may be made in the embodiments here chosen for the purpose of illustrating the present invention without departing from the scope thereof as defined by the independent claims.

What is claimed is:

1. An apparatus for spraying particulates from a moving vehicle comprising:
    a hopper supportable by said vehicle for storing the particulates,
    said hopper having a hopper discharge opening out through which said particulates can pass,
    a tubular barrel supportable by said vehicle,
    said tubular barrel having a first barrel end and a second barrel end,
    an air blower means operatively connected to said first barrel end for blowing air through said barrel and out said second barrel end,
    a conduit means for directing said particulates into the air passing through said barrel,
    a metering means communicating with said hopper discharge opening and with said conduit for receiving said particulates from said discharge opening and progressively delivering metered amounts of said particulates to said conduit means,
    a supporting means for supporting said barrel and providing for a swinging pendulum action of said barrel relative to said vehicle to help maintain the orientation of the tubular barrel as said vehicle travels over uneven and sloping terrain,
    said supporting means including a cradle mounted for swinging action about a longitudinal axis of said vehicle, a connecting means for connecting said barrel to said cradle so that said barrel and cradle move together, and
    a dampening means connected to said cradle for dampening the swinging action of said cradle and barrel.

2. The apparatus of claim 1 including,
    said hopper having a lower end portion
    said metering means being connected to said lower end portion,
    said conduit means being a flexible conduit and extending downwardly from said metering means, and
    said barrel being disposed below said metering means and having an opening communicating with said conduit means.

3. The apparatus of claim 1 wherein said dampening means includes a shock absorber.

4. The apparatus of claim 1 including,
    said supporting means including a frame supporting said hopper, and
    said barrel and said air blower means being suspended from said frame for swinging action relative thereto.

5. The apparatus of claim 1 including,
    said air blower means being supported by said cradle.

6. The apparatus of claim 5 including,
    said air blower means being secured to said barrel,
    a motor mounted on said barrel, and
    a balancing weight means connected to said cradle for shifting the center of gravity of the cradle laterally.

7. The apparatus of claim 1 including,
    a carrying means for carrying said hopper on said vehicle.

8. The apparatus of claim 1 including,
    a control means for controlling the rate at which said metering device delivers particulates to said conduit means.

9. The apparatus of claim 1 including,
    said supporting means maintaining the orientation of said barrel second end relative to the horizon as said vehicle travels over uneven and sloping terrain.

10. The apparatus of claim 1 including,
    said air blower means being essentially wholly supported by said barrel.

11. The apparatus of claim 1 including,
    a nozzle disposed at the end of said barrel opposite to said air blower means,
    a supplying means connected to said nozzle for supplying liquid under pressure to said nozzle, and
    said nozzle having an opening for directing said liquid into the stream of air emerging from said barrel so the liquid is applied to said particulates after they have passed out of said barrel.

12. The apparatus of claim 1 including,
    a hydraulic motor mounted on said blower for simultaneous movement with said blower and said barrel.

13. The apparatus of claim 1 including,
    said tubular barrel having a Y-shaped nozzle tip defining a pair of spaced and angularly disposed particulate outlets.

14. The apparatus of claim 1 including,
    a second tubular barrel communicating with said hopper and having a particulate discharge end spaced from said second barrel end and disposed to provide slightly overlapping particulate spray patterns with said first tubular barrel.

15. The apparatus of claim 14 including,
    said metering means metering the flow of particulates through said second tubular barrel, and
    a second air blower means connected to said second tubular barrel for blowing air through and out said second tubular barrel.

16. The apparatus of claim 1 including, a weighted lug means connected to said cradle for shifting the center of gravity of said cradle laterally.

17. The apparatus of claim 1 including, said conduit means comprising a flexible piping flexible enough to accommodate the swinging action and the movement of said barrel relative to said hopper.

18. The apparatus of claim 1 including, an applying means for applying liquid to the stream of air and particulates as they emerge from said barrel.

* * * * *